Dec. 5, 1972   R. N. MESIAH ET AL   3,705,019
AGGLOMERATION OF CYANURIC ACID
Filed May 11, 1971
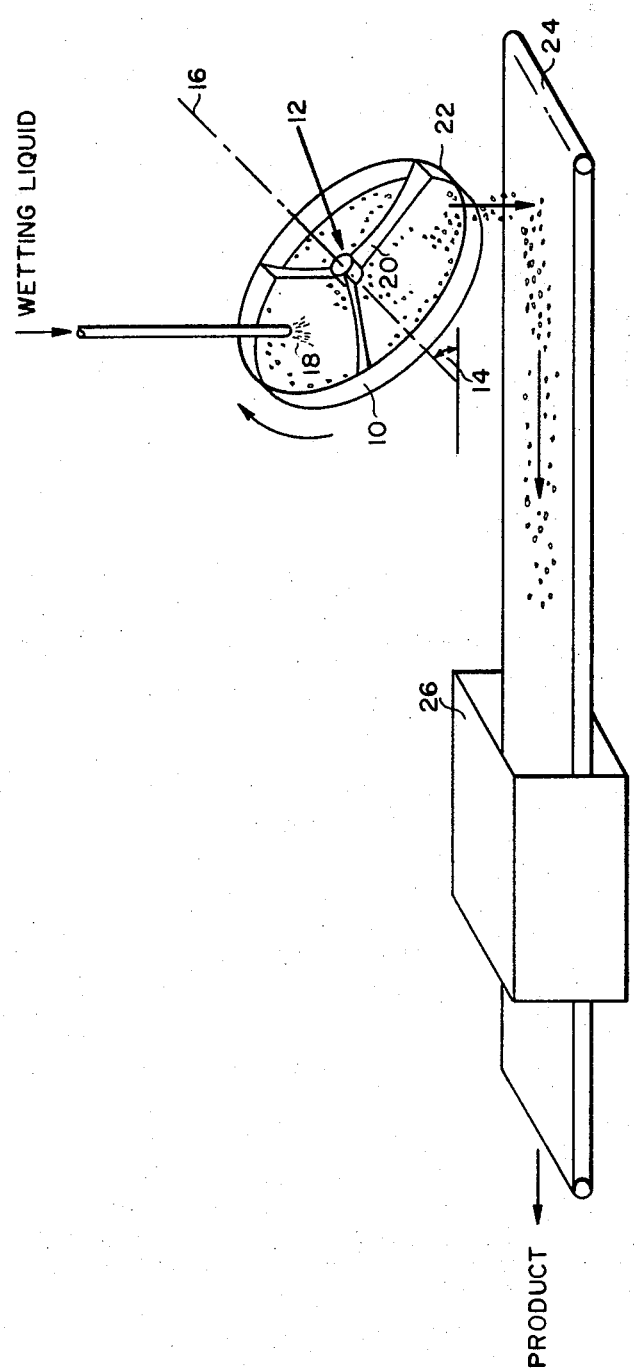
INVENTORS
RAYMOND N. MESIAH
DAVID GOLDSTEIN
BY   WILLIAM F. BECK United States Patent Office 3,705,019
Patented Dec. 5, 1972

3,705,019
AGGLOMERATION OF CYANURIC ACID
Raymond N. Mesiah, Somerset, William F. Beck, Princeton Junction, and David Goldstein, East Brunswick, N.J., assignors to FMC Corporation, New York, N.Y.
Continuation-in-part of abandoned application Ser. No. 886,676, Dec. 19, 1969. This application May 11, 1971, Ser. No. 142,374
Int. Cl. A01n 9/22; B01j 2/14; C07d 55/36
U.S. Cl. 23—313                                9 Claims

ABSTRACT OF THE DISCLOSURE

This invention relates to the agglomeration of powdered cyanuric acid to produce larger particles which are free-flowing and which dissolve more easily in water than does the powder. The cyanuric acid particles are wetted and contacted; this causes the particles to agglomerate into larger particles which are then dried.

CROSS-REFERENCE TO RELATED APPLICATIONS

This application is a continuation-in-part of application Ser. No. 886,676, filed Dec. 19, 1969 and entitled "Agglomeration of Cyanuric Acid," now abandoned.

BACKGROUND OF THE INVENTION

(A) Field of the invention

The standard commercial method of producing cyanuric acid is by pyrolysis of urea followed by acid digestion. This method produces a powdered cyanuric acid which is not free-flowing but cakes during storage and is difficult to dissolve in water. A high quality commercial product must be free-flowing for convenience in packaging and handling, especially in bulk transporting, and the acid must dissolve readily within its limited solubility. This invention is directed to a method of making powdered cyanuric acid free-flowing and less difficult to dissolve in water.

(B) Description of the prior art

Cyanuric acid is essentially insoluble in water, and the prior art teaches that the agglomeration of an insoluble material requires either the use of a binder, or compression. A recent example of the use of a soluble binder to agglomerate an insoluble material is disclosed in U.S. Pat. 3,464,824, issued to Jensen et al. on Sept. 2, 1969. That patent teaches that to agglomerate the insoluble material by the process of wetting, contacting and then drying, there must be present at least 2% of a soluble material which acts as a binder. However, the addition of a binder to agglomerate insoluble materials is a source of an impurity which often is not desirable in the production of chemical products.

The prior art teaches that the method of agglomerating by wetting, contacting and then drying is effective with highly soluble materials such as salts. The prior art also teaches that the method of agglomerating using a rotating pan is not particularly successful where it is desired to have a chemical reaction take place during agglomeration, see Browning, Jon E., "Agglomeration," Chemical Engineering, Dec. 4, 1967, pages 149 and 166, McGraw-Hill.

The other prior art method often used to agglomerate insoluble materials involves compression of the particles. This other method is practiced by techniques such as briquetting, tableting or compacting and granulating. Briquetting and tableting are not effective with cyanuric acid. The close tolerance mechanical equipment used in tableting and briquetting, especially the metering equipment, give unsatisfactory performance with cyanuric acid powder. This is caused by the difficulties involved in handling cyanuric acid powder, which tends to cake and is not free-flowing.

The only mechanical compression method of agglomerating known to be useful with cyanuric acid involves the use of rollers in compacting and granulating, see U.S. Pat. 3,380,667 issued to Moore et al. on Apr. 30, 1968. Although this method produces an acceptable product, it requires expensive equipment with high maintenance costs. The power requirements for mechanically compacting and granulating are also expensive. Furthermore, the teaching of U.S. Pat. 3,380,667 is that the presence of more than 0.3% moisture is to be avoided and also that the presence of water-soluble salts must be kept to a minimum.

SUMMARY OF THE INVENTION

We have found that despite the essential insolubility of cyanuric acid, we are able to agglomerate this material in powder form by wetting it with a liquid in which it is soluble to the extent of about 0.1 to 0.8% by weight and while the powder is wet, the powder particles are contacted by some suitable process, such as mixing, to increase the particle size and then dried by evaporation. The preferred liquid is water. The size of the agglomerated particles can be controlled by adjusting the amount and type of the wetting liquid and the method and the time of contacting the powder particles.

BRIEF DESCRIPTION OF THE DRAWING

The figure is a schematic representation of the preferred embodiment of our invention. It depicts a method for continuously practicing this invention with the means for mixing the cyanuric acid being an inclined rotating pan and the wetting liquid being sprayed onto the powder in the pan.

DETAILED DESCRIPTION OF THE INVENTION

Cyanuric acid, such as that produced by the standard commercial method of pyrolysis of urea, is a fine powder (50% being −200 mesh) which is not free-flowing and cakes during storage. This powdered cyanuric acid is difficult to dissolve in water. When it is added to a large volume of water, some of the powder tends to float on the surface and the remainder sinks to the bottom and cakes into hard lumps. This makes the powdered cyanuric acid unsuitable for many uses, such as the treatment of water in swimming pools. These problems have previously been overcome by mechanically compacting and granulating the cyanuric acid.

The process of our invention overcomes the problems associated with the prior compacting and granulating techniques; namely, expensive equipment with high operating and maintenance costs. We agglomerate the cyanuric acid by the much simpler process of wetting and contacting cyanuric acid powder particles to increase their size and then drying them.

Cyanuric acid is only slightly soluble in water. At 81° F. (27° C.) a saturated aqueous solution contains only 0.27% by weight of cyanuric acid. The prior art teaches that the general method of agglomerating by wetting and contacting is most effective with highly soluble materials. If the material to be agglomerated is essentially insoluble, the prior art teaches that it is necessary to use a binder or to compress the material by methods such as briquetting, tableting, or compacting and granulating. Contrary to the teaching and expectations of the prior art, our invention agglomerates essentially insoluble cyanuric acid by wetting and contacting the essentially insoluble cyanuric acid powder particles. Furthermore, we obtain improved results when a chemical reaction takes place with the agglomeration; this also is contrary to prior expectations.

The cyanuric acid particles which are treated by the process of our invention are fine powder particles (generally at least 50% —100 mesh, and often at least 50% —200 mesh). The feed may include a recycle of the fines from the agglomeration process. These fine particles are enlarged by our agglomeration process to a size such that a major portion of them are larger than 100 mesh. This transformation of the cyanuric acid from fine powder to agglomerated particles has a marked effect on the physical properties of the cyanuric acid; namely, it converts it to a state in which it is free-flowing and does not cake during storage. Surprisingly, the ability of the particles to dissolve in water is also improved.

In order to maximize these desired effects upon the cyanuric acid particles, an appreciable quantity of wetting liquid is used (between about 26 and 36% of the total feed weight).

Substantially all of the wetting liquid is evaporated from the agglomerated particles during the drying stage of four process. Therefore, in order to minimize drying time, the preferred drying temperature is above the boiling temperature of the wetting liquid, although drying temperatures below boiling can be employed. The preferred drying temperature is 100 to 120° C. when water is used as the wetting liquid.

The operating temperature during the wetting of the cyanuric acid is not critical, and for economic reasons room temperature is normally used. However, the wetting process can be operated at any temperature between that at which the liquid freezes and either the liquid evaporates or the cyanuric acid softens, so long as there is the required degree of cyanuric acid solubility at the chosen operating temperature.

The wetting liquid must be capable of evaporating from the agglomerated cyanuric acid at a temperature below the decomposition temperature of cyanuric acid. The wetting liquid must also dissolve cyanuric acid to about the same extent as water dissolves cyanuric acid, that is to the extent of about 0.1 to 0.8 gram of cyanuric acid per 100 grams of liquid. The preferred wetting liquid is water, although other liquids can be used either alone or in combination so long as they meet the above requirements.

The wetting liquid may contain specific additives to improve the quality of the agglomerated particles, such as their strength or solubility in water. When the additive is sodium hydroxide, both the strength and the solubility of the agglomerated particles are increased. A chemical reaction is believed to take place in situ during the agglomeration, between the sodium hydroxide and the cyanuric acid, to form the sodium salt of cyanuric acid. The preferred amount of sodium hydroxide needed to obtain the maximum improvement in both strength and solubility is provided when a 2% to 8% aqueous sodium hydroxide solution is substituted for water as the wetting liquid. However, the sodium as sodium cyanurate is an impurity in the cyanuric acid which may make it unsuitable for some uses.

Results similar to those obtained with aqueous sodium hydroxide are obtained when the wetting liquid is a 0.1% aqueous sodium silicate solution. The desired reaction of the cyanuric acid with a base surprisingly takes place quite effectively during agglomeration without any adverse effect on the course of the agglomeration.

The preferred embodiment of this invention is depicted in the figure. Powdered cyanuric acid is fed continuously onto a rotating pan 10 at position 12. The pan is inclined at an angle 14 and is rotated about an axis 16 substantially perpendicular to its base. The wetting liquid is sprayed onto the cyanuric acid at the point 18 where the fines tend to gather. This is usually at a position of about eleven o'clock relative to the low point of the pan for a pan having the configurations and adjustments of the pan used in the examples.

The cyanuric acid is mixed by the rotating action of the pan assisted by the baffle plates 20, and the wet particles agglomerate during this mixing. The wet agglomerated particles tend to accumulate near the bottom of the pan and are discharged by spilling over the retaining edge 22 of the pan 10 onto transporting means 24. The wet agglomerated cyanuric acid particles are then dried in drier 26 and emerge as a final product.

The drying temperature preferably is above the boiling point of the wetting liquid at the ambient pressure. The size and other characteristics of the agglomerated cyanuric acid particles can be varied by adjusting such parameters as the time of mixing, the amount of liquid, and such factors as pan configuration, speed of rotation of the pan, feed rate and the like.

The following examples are provided by way of illustration only and are not intended to limit the scope of the invention. As used herein the term "mesh" preceded by a number and a plus or minus sign refers to that numbered U.S. Standard Series sieve size. A minus sign means that the material passes through that size sieve and a plus sign means that the material is retained on the seive. All percentages are in weight percent.

All of the examples were run on a commercially available pelletizing pan known as the Dravo-Lurgi pelletizing disk, although other similar equipment can be used. This unit consisted of a 14-inch diameter pan with a 2½-inch high retaining edge perpendicular to the bottom of the pan. The angle of inclination of the pan was set at 47° for all of the examples. The pan had three baffle plates, each three inches high, which diverted the flow of material in such a way that the smallest particles remained on the pan. The rotating speed of the pan was set at 33 revolutions per minute for all of the examples.

Example 1

Cyanuric acid powder (98% —100 mesh) was fed continuously onto the pan at the 5 o'clock position at the rate of 5 pounds per hour. Water was added as the wetting liquid at a rate equal to 32.0% of the total feed weight, namely at 2.35 pounds per hour. The water was sprayed onto the pan at the 11 o'clock position from 6 inches above the bed by an air atomizing sprayer. As the water was added, the cyanuric acid began to agglomerate into larger particles. When the pan became full, the larger particles overflowed the retaining edge at about the 7 o'clock position and were collected and dried at 100 to 120° C. The particle size of the final product was 72.1% +100 mesh with over one-half of the particles in the size range of —20 to +60 mesh. This product particle size was obtained from a feed which was 2% +100 mesh.

Example 2

In this example the same procedure was followed as in Example 1. The water rate was decreased from 32.0% to 23% of the total feed rate. The particle size of the final product was 33.7% +100 mesh from a feed which was 2% +100 mesh.

Cyanuric acid powder was agglomerated under various conditions of wetting, using the same procedures as were used in Examples 1 and 2. The results for various water rates and with different additives in the water are reported in the following table:

| Run number | Blank | I | II | III | IV | V | VI | VII | VIII | IX | X |
|---|---|---|---|---|---|---|---|---|---|---|---|
| Liquid: | | | | | | | | | | | |
| Composition (percent): | | | | | | | | | | | |
| $H_2O$ | 100 | 98 | 96 | 94 | 92 | 99.8 | 99.9 | | 95.9 | 100 | 100 |
| NaOH | | 2 | 4 | 6 | 8 | | | | 4 | | |
| Cyanuric acid | | | | | | 0.2 | | | | | |
| $Na_2SiO_3$ | | | | | | | 0.1 | 0.1 | | | |
| Liquid quantity, percent of total feed rate | | 32 | 33.0 | 32.5 | 32.5 | 30.5 | 32 | 35 | 32.5 | 23 | 17.3 |
| Feed rate, pounds per hour cyanuric acid | | 10 | 10 | 10 | 10 | 10 | 10 | 10 | 10 | 10 | 10 |
| Product sieve analysis, cumulative percent: | | | | | | | | | | | |
| +16 | 0 | 1.4 | 9.0 | 2.3 | 9.7 | 3.7 | 1.9 | 4.9 | 39.7 | | |
| +20 | 0 | 9.5 | 19.9 | 12.3 | 21.4 | 6.5 | 2.8 | 23.3 | 46.6 | | |
| +40 | 0 | 46.6 | 63.4 | 64.4 | 65.4 | 33.8 | 26.9 | 60.0 | 54.0 | | |
| +60 | 0 | 74.9 | 82.0 | 80.4 | 83.3 | 69.0 | 57.0 | 74.3 | 61.7 | | |
| +100 | 2 | 85.6 | 90.0 | 86.4 | 89.8 | 85.2 | 72.3 | 81.3 | 72.6 | 33.7 | 3.7 |
| −100 | 98 | 14.4 | 10.0 | 13.6 | 10.2 | 14.8 | 27.7 | 18.7 | 27.4 | 66.3 | 96.3 |
| Total | 100 | 100.0 | 100.0 | 100.0 | 100.0 | 100.0 | 100.0 | 100.0 | 100.0 | 100.0 | 100.0 |

The results of run number X show that when 17.3% water was added, only about 2% of the cyanuric acid powder particles were agglomerated to particles larger than 100 mesh. (Total +100 mesh was 3.7%). The results of run number IX show that when 23% water was added, only about 32% of the cyanuric acid powder particles were agglomerated to particles larger than 100 mesh. (Total +100 mesh was 33.7%).

Example 3

When the procedure of Example 1 is followed employing water in the amount of 26% by weight of the total feed product having particles of a satisfactory particle size is obtained (at least 50% +100 mesh). Likewise, when the water content in the feed is 36% by weight of the total feed, product having substantially greater than 50% by weight of its particles +100 mesh is obtained.

Generally speaking, as the amount of wetting liquid is increased, the particle size increases with acceptable product obtained when the water rate reaches 26% of the total feed rate. The preferred size range of −20 to +60 mesh is maximized when the amount of liquid added is between 32 and 36% of the total feed rate. Very good product is obtained with water rates between 30.5 and 36% of the total feed rate, as demonstrated by runs I through VIII. When substantially more than about 36% of water is used, too-large globs cyanuric acid tend to form. Example 1 and runs I through VIII are within the preferred range of 30.5 to 36% of wetting liquid and the products so produced were free-flowing, did not cake upon storage and when added to water, sank rapidly without the formation of hard lumps.

We claim:

1. A method of producing free-flowing cyanuric acid particles which dissolve readily within the limited solubility of cyanuric acid without caking or lumping, comprising: wetting powdered cyanuric acid particles of which a major portion are particles smaller than 100 mesh with a liquid in which cyanuric acid is soluble in the amount of 0.1 to 0.8 grams per 100 grams of liquid, the amount of said liquid being equal to between 26% and 36% of the total weight of the powdered cyanuric acid and the liquid, mixing the powdered particles and the liquid to form agglomerated particles and drying the agglomerated particles to remove essentially all of the liquid by evaporation.

2. The method of claim 1 wherein the liquid is water.

3. The method of claim 2 wherein the amount of water employed is between 30.5 and 36% of the total feed weight, and the drying of the resulting enlarged particles is carried out at a temperature of 100 to 120° C.

4. The method of claim 2 wherein the amount of water employed is between 32% and 36% of the total feed weight.

5. The method of claim 1 wherein the liquid is an aqueous sodium hydroxide solution containing 2% to 8% of sodium hydroxide by weight.

6. The method of claim 1 wherein the liquid is an aqueous sodium silicate solution containing about 0.1% of sodium silicate by weight.

7. The method of claim 1 wherein the powdered cyanuric acid is fed onto a rotating inclined pan having a retaining edge, the liquid is sprayed onto the powdered cyanuric acid on the pan and mixing is achieved by the rotating action of the rotating inclined pan.

8. The method of claim 7 wherein the powdered cyanuric acid is continuously fed onto the rotating inclined pan and water is continuously sprayed onto the powdered cyanuric acid to continuously form agglomerated particles which are continuously discharged by overflowing the pan.

9. The method of claim 7 wherein the amount of water sprayed onto the powdered cyanuric acid is 30.5 to 36% of the total feed weight and the pan is inclined at an angle of 47°, to maximize the formation of +100 mesh particles.

References Cited

UNITED STATES PATENTS

| | | | |
|---|---|---|---|
| 3,357,979 | 12/1967 | Sobocinski | 260—248 A |
| 2,952,679 | 9/1960 | Perret | 260—248 A |
| 3,107,244 | 10/1963 | Robertson | 260—248 A |
| 3,409,619 | 11/1968 | Kosel | 23—294 |
| 3,172,886 | 3/1965 | Christoffel | 260—248 A |
| 2,979,421 | 4/1961 | Rissman | 23—313 |
| 3,446,218 | 5/1969 | Stirling | 23—313 |
| 3,408,169 | 10/1968 | Thompson | 23—313 |
| 2,860,598 | 11/1958 | Loesche | 23—313 |
| 3,168,437 | 2/1965 | Galloway | 71—91 |

FOREIGN PATENTS 506,070    9/1954    Canada    260—248 A

NORMAN YUDKOFF, Primary Examiner

S. J. EMERY, Assistant Examiner

U.S. Cl. X.R.

71—93; 260—248 A; 264—117